US005751931A

United States Patent [19]
Cox et al.

[11] Patent Number: 5,751,931
[45] Date of Patent: May 12, 1998

[54] THREE DIMENSIONAL GRAPHICAL DISPLAY OF INFORMATION

[75] Inventors: Kenneth Charles Cox; Stephen Gregory Eick, both of Naperville, Ill.

[73] Assignee: Lucent Technologies Inc., Murray Hill, N.J.

[21] Appl. No.: 424,762

[22] Filed: Apr. 18, 1995

[51] Int. Cl.$^6$ .................................................. G06T 17/00
[52] U.S. Cl. .......................... 395/140; 395/119; 395/120
[58] Field of Search .................................... 395/120–140, 395/119

[56] References Cited

U.S. PATENT DOCUMENTS 5,446,833  8/1995  Miller et al. .............................. 395/125

FOREIGN PATENT DOCUMENTS 0 412 692 A   2/1991   European Pat. Off. .......... H04M 3/36

OTHER PUBLICATIONS

K. C. Cox et al., "Case Study: 3D Displays of Internet Traffic," *Proc. Information Visualization Conference,* Oct. 1995, Atlanta, GA, *IEEE Computer Soc. Press,* Los Alamitosk CA 1995, pp. 129–131, 152.
S. Mukherjea et al., "Visualizing The World–Wide Web With The Navigational View Builder," *Computer Networks And ISDN Systems,* vol. 27, No. 6, Apr. 1995, Netherlands, pp. 1075–1087.
"Atlante Turistico Italiano," 1983, Touring Club Italiano, Milano, Italia, p. 5.
T. A. Foley et al., "Visualizing Functions Over A Sphere," *IEEE Computer Graphics And Applications,* vol. 10, No. 1, Jan. 1990, pp. 32–40.
Patent No. 5,136,690, filed on Mar. 21, 1991 and issued on Aug. 4, 1992 to Becker et al. Class: 395/161.
U.S. Patent Application Ser. No. 08/141,885, "Graphical Display of Relationships," filed Oct. 22, 1993.

R. A. Becker et al., "Visualizing Network Data," *IEEE Transactions on Visualization and Graphics,* vol. 1, No. 1, 16–28 (Mar. 1995).
S. G. Eick et al., "Navigating Large Networks with Hierarchies," *Visualization '93 Conference Proceedings,* 204–210 (San Jose, CA, 25–29 Oct. 1993).
K. M Fairchild et al., "Sem Net: Three–dimensional Graphic Representations of Large Knowledge Bases," *Cognitive Science and Its Applications for Human Computer Interaction,* 201–233 (1988).
M. Sarkar et al., "Graphical Fisheye Views," *Communications of the ACM,* vol. 37, No. 12, 73–84 (Dec. 1994).
E. R. Gansner et al., "A Technique for Drawing Directed Graphs," *IEEE Transactions on Software Engineering,* vol. 19, No. 3, 214–230 (Mar. 1993).

*Primary Examiner*—Almis R. Jankus
*Attorney, Agent, or Firm*—Donald P. Dinella; Jeffrey M. Weinick

[57] ABSTRACT

A method and apparatus for the three dimensional graphical display of information. Information is displayed as nodes and arcs connecting nodes. The nodes and arcs are displayed with their three dimensional characteristics used to encode data attributes. In one embodiment, the nodes and arcs represent geographic network data and are displayed on a representation of a globe. The height of the arcs above or below the surface of the globe encodes a link attribute of the data, while the height of the nodes above or below the surface of the globe encodes a node attribute of the data. Three dimensional characteristics of the nodes and arcs other than height may also be used to encode data attributes. In addition, the three dimensional representation of the data allows for novel thresholding techniques, such as drawing certain nodes and arcs below the surface of the globe and using the globe as a clipping surface. User interaction is also enhanced, for example by allowing users to interactively manipulate the clipping surface as well as the three dimensional display characteristics of the nodes and links.

31 Claims, 13 Drawing Sheets

(2 of 21 Drawing(s) in Color)

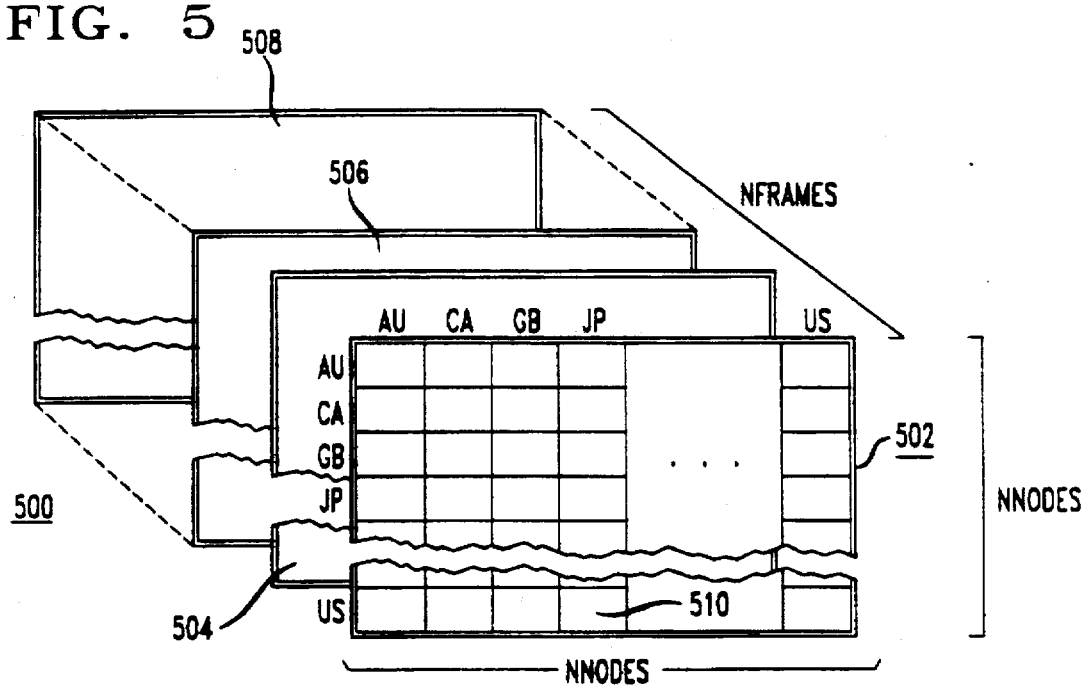

RECTANGULAR LINE PATHS

MERCATOR LINE PATHS

GREAT CIRCLE PATHS

THREE DIMENSIONAL GRAPHICAL DISPLAY OF INFORMATION

FIELD OF THE INVENTION

The present invention relates generally to graphical displays in computer systems. More particularly, the present invention relates to graphically representing information using a three dimensional display representation.

BACKGROUND OF THE INVENTION

A network is a collection of nodes which are pairwise connected by edges. A network display tool is a device which depicts a network as an image composed of graphical glyphs, typically by placing each node at a particular position and then connecting nodes with lines to show the edges. The display tool may use graphical characteristics of the glyphs to encode information about the network.

The network displays produced by prior art display tools are often visually crowded because the lines cross one another. This crossing produces a visual "clutter" which makes the display difficult to interpret. Techniques for reducing this clutter are desirable, in that they produce displays which are more readily understood by users of the tool.

One technique for reducing clutter is disclosed in the copending U.S. patent application Ser. No. 08/141,885, filed Oct. 22, 1993, entitled Graphical Display of Relationships, which describes node positioning techniques in which the node positions are selected so that related nodes are grouped together in the display. However, this technique does not completely solve the problem of crossing links. In addition, it cannot be readily applied to geographic networks, where the placement of the nodes is determined by the geography.

Other techniques for reducing clutter involve interactions whereby the user of the display tool can manipulate the displayed image. One prior art display tool which depicts time-series network data and provides such user interactions is shown in FIG. 20. The network is represented by a graph consisting of nodes and links between the nodes. The nodes are drawn as rectangular glyphs, and the links between nodes are drawn as lines connecting the nodes. The graphical parameters of the glyphs and lines are determined by certain data attributes, i.e., the time-series network data. For example, the size of a glyph in the X dimension may be determined by one node attribute and the size of a glyph in the Y dimension by another. Similarly, the thickness and color of lines may be determined from a link attribute. The graph may be superimposed on a map, which supplies geographic context.

For references to such prior art display tools see for example, Becker et al., U.S. Pat. No. 5,136,690, Dynamic Graphical Analysis of Network Data; and Richard A. Becker and Stephen G. Eick, "Visualizing Network Data", *IEEE Transactions on Visualization and Graphics*, Vol. 1, No. 1, 1995, pages 16–28.

For illustration, FIG. 20 could be considered a graph which represents AT&T's long-distance telephone network. The nodes of the graph could represent switches, and the links connections between the switches. The operation of the network generates many different time-series statistics which can be used as attributes. In this figure, the attributes being displayed are traffic overloads in and between the switches during the 1989 California earthquake.

The rectangles show the number of blocked calls, with the size of the rectangle in the X dimension encoding the number of blocked incoming calls and the size in the Y dimension encoding the number of blocked outgoing calls. The extremely wide rectangles in the west coast area show how those switches are being overloaded by the vast number of people trying to call the area. The lines show the number of blocked calls between the switches. As might be expected, almost all the blocking is from switches outside the earthquake area to switches in the area.

A number of interactive controls are shown in FIG. 20. The buttons 2001 and sliders 2002 to the left of the image change the way in which the glyphs and lines are drawn. The colorslider thresholding mechanism 2003 below the image allows the user to filter links based on the current link attribute. In the figure, the slider 2003 is set so that only links which have between 1443 and 9241 blocked calls will be shown. The timeslider 2004 below the colorslider 2003 allows the user to choose which frame of the time-series data will be displayed. The all on button 2005 and the all off button 2006 also provide mechanisms whereby the user can reduce visual crowding. Although such interaction mechanisms are effective in reducing crowding, they can only help to a certain extent.

FIG. 21 shows a prior art display showing world Internet traffic between countries on a two-dimensional map. Note that links from North America to eastern Asia cross over Europe, obscuring the North America to Europe, Europe to eastern Asia, and intra-Europe links. Also note that the space used by the Pacific Ocean is largely wasted since few links pass over this space. One solution to this problem is to route the North America to east Asia links across the Pacific (which is, in reality, the shortest route between the two areas). This could be done by having the links end at one edge of the map and resume at the other. However, experiments have shown that this break in the lines is not effective, as the user has difficulty matching up the lines on opposite sides of the display.

Thus, there is a need for a graphical display tool which can convey information in a manner which allows the encoded data to be more readily interpreted by users.

SUMMARY OF THE INVENTION

The present invention provides a three-dimensional display of information which solves the problems of the prior art. The addition of the third dimension provides a means for displaying any number of arcs and allows the user, via interactive control of the viewpoint, to separate the arcs so they do not appear to cross in the display. In addition, the move to a three dimensional display allows for novel methods of encoding information attributes in the third dimension, and for novel user interactions with the display. For example, the height of an arc or node relative to some surface may encode some data attribute related to the link represented by that arc, or the data attribute of the node, respectively.

The addition of the third dimension also allows for novel thresholding techniques as well. A clipping surface may be introduced into the three dimensional space which obscures those arcs and nodes which do not meet some threshold value. Users may interactively manipulate the clipping surface and/or the glyphs in any of the three dimensions to vary such thresholding functions.

These and other advantages of the invention will be apparent to those of ordinary skill in the art by reference to the following detailed description and the accompanying drawings.

BRIEF DESCRIPTION OF THE DRAWINGS

FIG. 4 shows a schematic of the Nodes table data structure.

FIG. 5 shows a schematic of the Linkdata table data structure.

FIG. 6 shows a schematic of the Nodedata table data structure.

DETAILED DESCRIPTION

1. Overview

Figure 11:
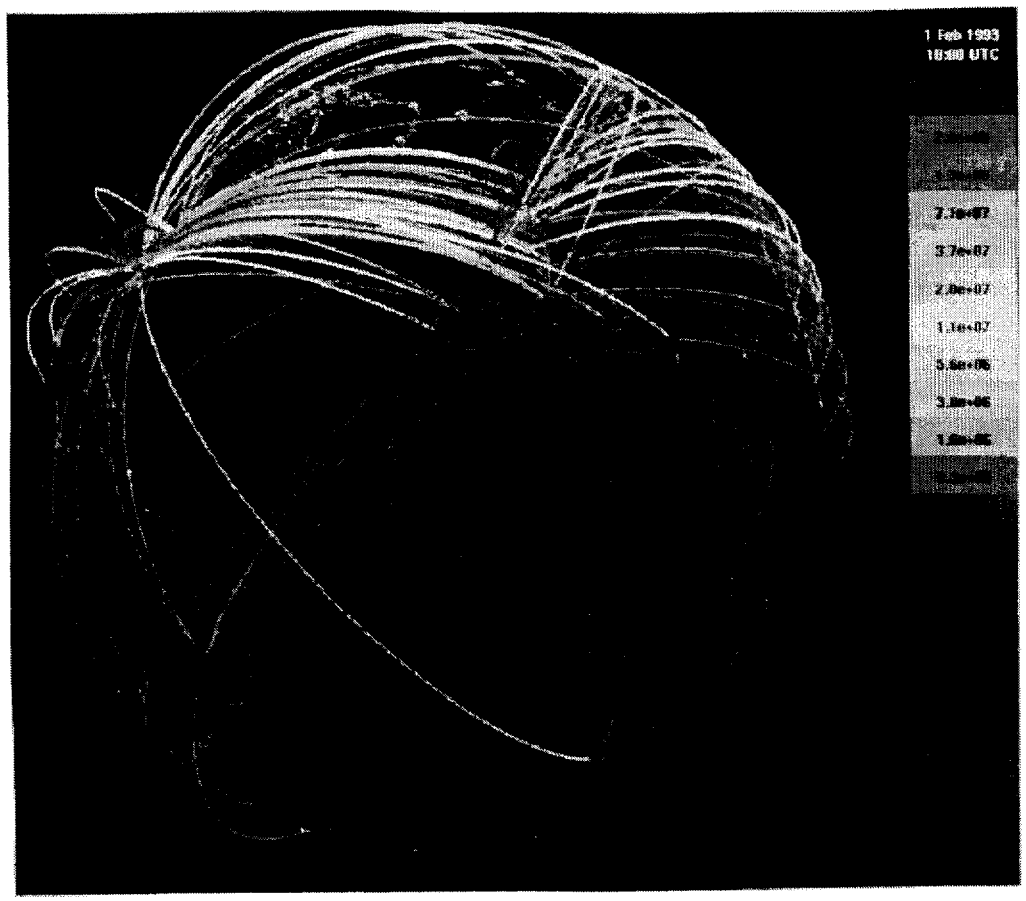
FIG. 11 shows a display image in accordance with the polar system of projection.

In the embodiment described herein, the present invention is configured to display time-series data for a global network. The images shown in FIGS. 8, 11 and 12 (discussed in further detail below) represent Internet traffic between countries. The time-series data represents a one-week period in February of 1993. The nodes in the network are thus the countries, and the links connect the pairs of countries with traffic. The network contains 50 nodes and 50×50 or 2500 links. The source data is a link statistic which gives the number of packets between each pair of countries for each two-hour interval during the week, i.e., 84 frames of time-series data, for a total of 50×50×84 or 210,000 values. This link statistic is used to derive a node statistic, where the value for each node is the sum of the traffic between that node and all other nodes. This again consists of 84 frames of time-series data, or 50*84=4200 values. The data is displayed in a three dimensional representation on a display screen. The globe is illuminated by a light which is positioned to reflect the angle of the sun for the frame of the time-series data that is displayed. The node statistics are represented by glyphs positioned in relation to the globe, with the characteristics of the glyph encoding various node statistics. The links are represented by arcs which connect the node glyphs, with the characteristics of the arc encoding various link statistics. The user may interact with the display through the use of a graphical pointing device. These, and other aspects of the present invention are described in further detail below.

2. System Architecture

As used herein, the term computer includes any device or machine capable of accepting information, applying prescribed processes to the information, and supplying the results of the processes.

Figure 1:
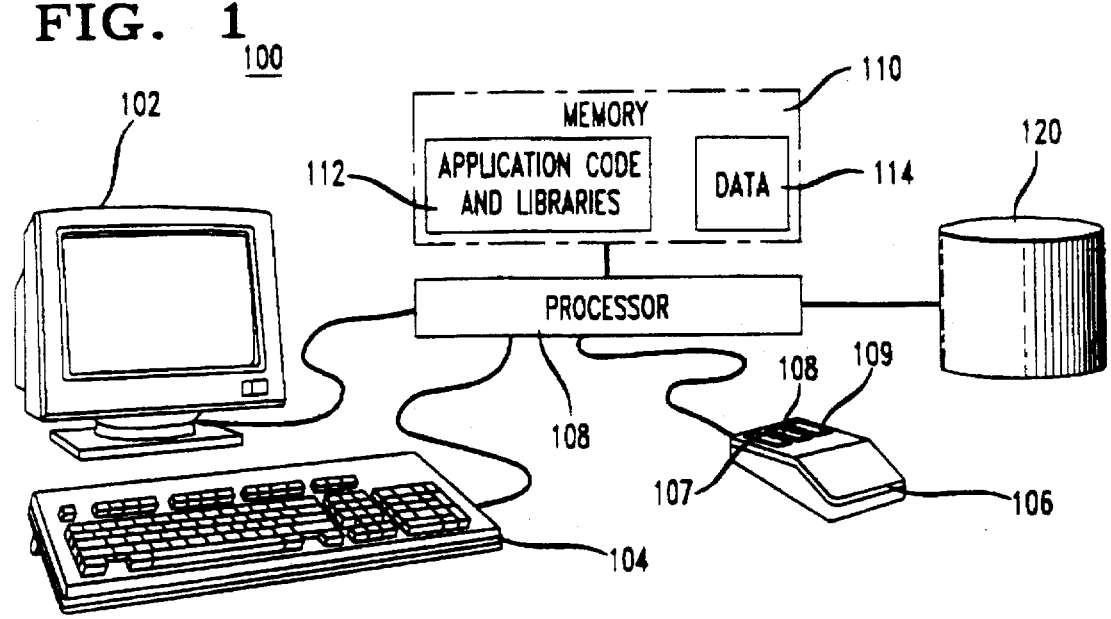
FIG. 1 shows a schematic of the components of a computer system which can be configured to implement the present invention.

The functions of the present invention are preferably performed by a programmed digital computer as shown in FIG. 1. FIG. 1 shows a computer system 100 which comprises a display monitor 102, a textual input device such as a computer keyboard 104, a graphical input device such as a mouse 106, a computer processor 108, a memory unit 110, and a non-volatile storage device such as a disk drive 120. The mouse 106 has a left mouse button 107, a center mouse button 108 and a right mouse button 109, which allow for user interaction. The memory unit 110 includes a storage area 112 for the storage of, for example, application code and library code, and a storage area 114 for the storage of data. The computer processor 108 is connected to the display monitor 102, the memory unit 110, the non-volatile storage device 120, the keyboard 104, and the mouse 106. The external storage device 120 and the memory unit 110 may be used for the storage of data and computer program code. The computer processor 108 executes the application program code and library code which is stored in the memory unit 110 in storage area 112. During execution, the processor may access data in storage space 114 in the memory unit 110, and may access data stored in the non-volatile storage device 120. The computer system 100 may suitably be any one of the types which are well known in the art such as a mainframe computer, a minicomputer, a workstation, or a personal computer.

Figure 2:
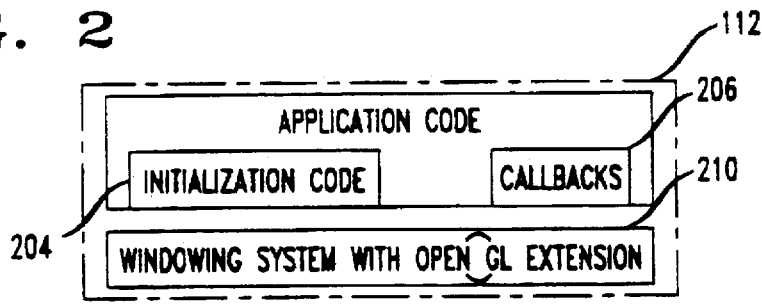
FIG. 2 shows the contents of a portion of the memory unit of the computer system.

The storage area 112 is shown in more detail in FIG. 2 as containing application code 202 and windowing system code 210. In one embodiment, the present invention is implemented using a windowing system 210 which supplies an interface to a graphics library, such as OpenGL. (OpenGL is a trademark of Silicon Graphics, Inc.) The OpenGL graphics library is a hardware-independent library for three-dimensional graphics. It provides functions for drawing lines and filled polygons, for creating "display lists" of commands, and for manipulating viewpoint, color, and lighting. The OpenGL graphics library is available from Silicon Graphics, Inc. of Mountain View, Calif. For additional information on Open GL see, Jackie Neider, Tom Davis and Mason Woo, "Open GL Reference Manual", Addison-Wesley Publishing Co., 1992; and Jackie Neider, Tom Davis and Mason Woo, "Open GL Programming Guide", Addison-Wesley Publishing Co., 1992. Examples of windowing systems which are suitable for implementation of the present invention include the X Windowing System and Windows NT. (X Windowing System is copyrighted by The Massachusetts Institute of Technology; Windows NT is a trademark of the Microsoft Corporation). For further information on these windowing systems see, "X Window System User's Guide", by Valerie Quercia and Tim O'Reilly, published by O'Reilly & Associates, Inc., Sebastopol Calif., 1989, Volume 3 of "The X Window System Series"; and "Inside Windows NT (TM)", by Helen Custer, published by Microsoft Press (A Division of Microsoft Corporation), Redmond Wash., 1993.

The application code 202 consists of initialization code 204 and a number of callback functions 206. The program performs the initialization and then turns control over to the windowing system 210. The windowing system 210 reacts to user inputs by invoking the callback functions 206 of the application code 202.

Figure 3:
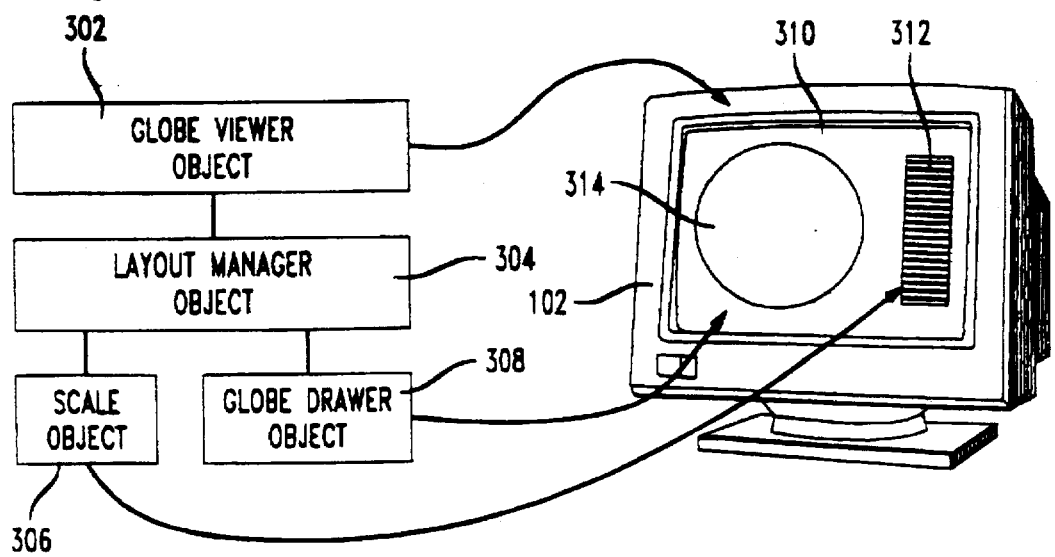
FIG. 3 illustrates the object-oriented design of the application code.

In the preferred embodiment, the application code 202 has an object-oriented design, as shown in FIG. 3. Three object classes, GlobeViewer, GlobeDrawer, and Scale, are used in the code. One object of each of these types is created by the code during initialization. As shown in FIG. 3, a GlobeViewer object 302, a GlobeDrawer object 308, and a Scale object 306 are created. These objects are arranged in a parent-child tree as shown by the solid lines connecting the objects. Such an organization is commonly used by windowing systems, such as the X Windowing System. FIG .3 also shows the display monitor 102, and the images displayed. The dashed arrows connect each object with the corresponding portion of the image.

The GlobeViewer object 302 is created first and represents the program as a whole and is based on the top-level object (e.g., a MainWindow object in the X Windowing System) provided by the windowing system 210. The GlobeViewer object 302 thus appears on the display monitor 102 as the window 310 containing the image. A Layout Manager object 304 which is provided by the windowing system 210, is created next, as a child of the GlobeViewer object 302. The function of the Layout Manager object 304 is to position its child objects within the window 310 created by the GlobeViewer object 302. The two children of the Layout Manager object 304 are a Scale object 306 and a GlobeDrawer object 308. The Scale object 306 draws a color scale 312, and the GlobeDrawer object 308 draws a globe 314 and a network representation (described in further detail below) on the globe 314.

3. Data Structures

As described above, in one embodiment, the invention is implemented to display time-series data for a global network. The data in this exemplary embodiment is for Internet traffic between countries in a one week period. The nodes in the network are countries, and the links are the pairs of countries with traffic.

Three table data structures are stored in the data space 114 of memory unit 110. These tables are described in conjunction with FIGS. 4–6. The sizes of these data structures are determined by two parameters represented by the symbolic constants NNODES (the number of nodes in the network) and NFRAMES (the number of frames of time-series data).

The first table, Nodes, is shown in FIG. 4 as table 400. This table 400 contains NNODES records. Each record contains 4 fields. The first field 402 is a string containing the abbreviation for a country; the second field 404 is a string containing the full name of the country; the third field 406 contains a number representing the latitude of the country's capital; and the fourth field 408 contains a number representing the longitude of the country's capital. Each node is represented by a node number. These node numbers, shown in the Figure as 410, are used as indices into the table to obtain the latitude and longitude of the capital of a given country. These node numbers are not actually stored in the table 400, but are implicit in the structure of the table in a manner well known in the art. The latitude and longitude obtained from the table 400 are used to calculate the position of the nodes in the display.

The second table, Linkdata, is shown in FIG. 5 as table 500. This table 500 is a three-dimensional array of numbers which contains the time-series link data. The size of the array is NFRAMES×NNODES×NNODES. The frame number, f, is used as the first index into the table and chooses a frame, such as frame 502. Each frame 502, 504, 506, . . . 508, represents the link data between each pair of countries at a particular time. For example, frame 502 may represent the link data for Feb. 1, 1993 at 0:00 hours, while frame 504 represents the link data for Feb. 1, 1993 at 2:00 hours. In the present example, the data consists of data for a one week period so that frame 508 would represent the link data for Febuary 6 at 22:00 hours. Node numbers are used as the second and third indices such that in frame f of the time-series, the traffic between nodes i and j is represented by Linkdata[f][i][j]. In the example shown in FIG. 5, the network traffic between the United States and Japan on Feb. 1, 1993 at 0:00 hours is located at location 510 of frame 502.

The third table, Nodedata, is shown in FIG. 6. This table 600 is a two-dimensional array of numbers which contains the time-series node attribute data. The size of the array is NFRAMES by NNODES. In the present embodiment, the node attribute data is computed by summing over the link attributes of the Linkdata table 500. The table is set up so that in frame f of the time-series, the total traffic between node i and all other nodes is Nodedata[f][i]. In the example shown in FIG. 6, the total node traffic for the United States in time frame Feb. 1, 1993 at 0:00 is stored at location 602 The contents of the table are normalized such that all values are scaled to lie between 0 and 1.

When the invention is used to depict a geographic network, as in the presently described embodiment, the incorporation of a map into the image is useful in that it allows the user to determine the geographic location of each of the nodes. This can be readily done by converting the sphere into a globe by placing a map on the surface of the sphere. In the present embodiment, this is done by drawing the outlines of the continents onto the sphere. The outlines are obtained from a geographic database of the type well known in the art.

Other techniques can be used to produce a globe. One is to tessellate the surface of the sphere using the continental outlines and color each polygon produced by the tessellation green or blue according to whether the area is land or water, respectively. A second technique is to use texture-mapping to wrap an image of the world over the surface of the sphere.

4. Spherical Coordinates

Figure 7:
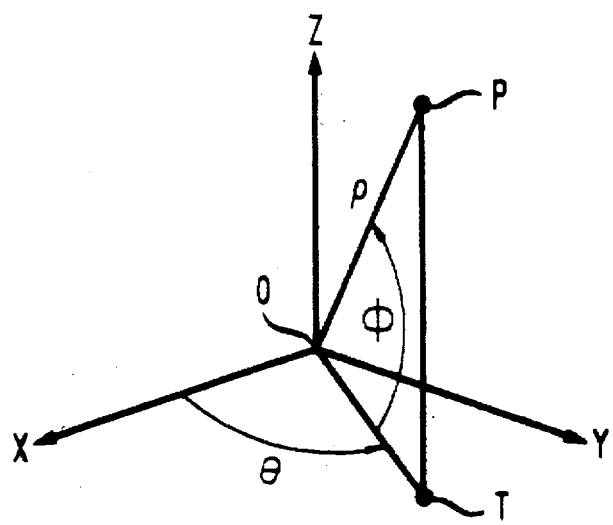
FIG. 7 illustrates the spherical coordinate system of the present invention.

Many of the calculations used to implement the present embodiment use a spherical coordinate system to specify points in three dimensional space. These coordinates are based on a sphere whose center is the origin of the coordinate system. FIG. 7 superimposes the spherical system on an XYZ system with the same origin O to show how the spherical coordinates of a point P are determined.

Point P is located at spherical coordinates $(\rho,\theta,\phi)$. $\rho$ is the distance of P from the center O of the sphere. The line PT through P perpendicular to the X-Y plane intersects that plane at a point T. $\theta$ is the angle that the line OT makes with the positive X-axis. $\phi$ is the angle that the line OP makes with the X-Y plane, so points with $Z>0$ have $\phi>0$ and points with $Z<0$ have $\phi<0$. Note that the measurement of $\phi$ herein differs somewhat from the usual convention in spherical coordinates, where $\phi$ is the angle OP makes with the positive Z axis. This is because the present embodiment makes extensive use of latitude and longitude, and it is somewhat simpler to handle them in this system: latitude is φ (north latitudes being positive angles) and longitude is θ.

Although the present embodiment performs many calculations using spherical coordinates, all OpenGL graphics library computations are in XYZ coordinates. The following equations are used to convert between (ρ,θ,φ) and (x, y, z) coordinates:

x=ρ*cos(θ)*cos(φ)
y=ρ*sin(θ)*cos(φ)
z=ρ*sin(φ)
ρ=sqrt(x*x+y*y+z*z)
θ=arctan(y/x)
φ=arctan(z/sqrt(x*x+y*y))=arcsin(z/ρ)

5. Drawing the Globe

Figure 8:
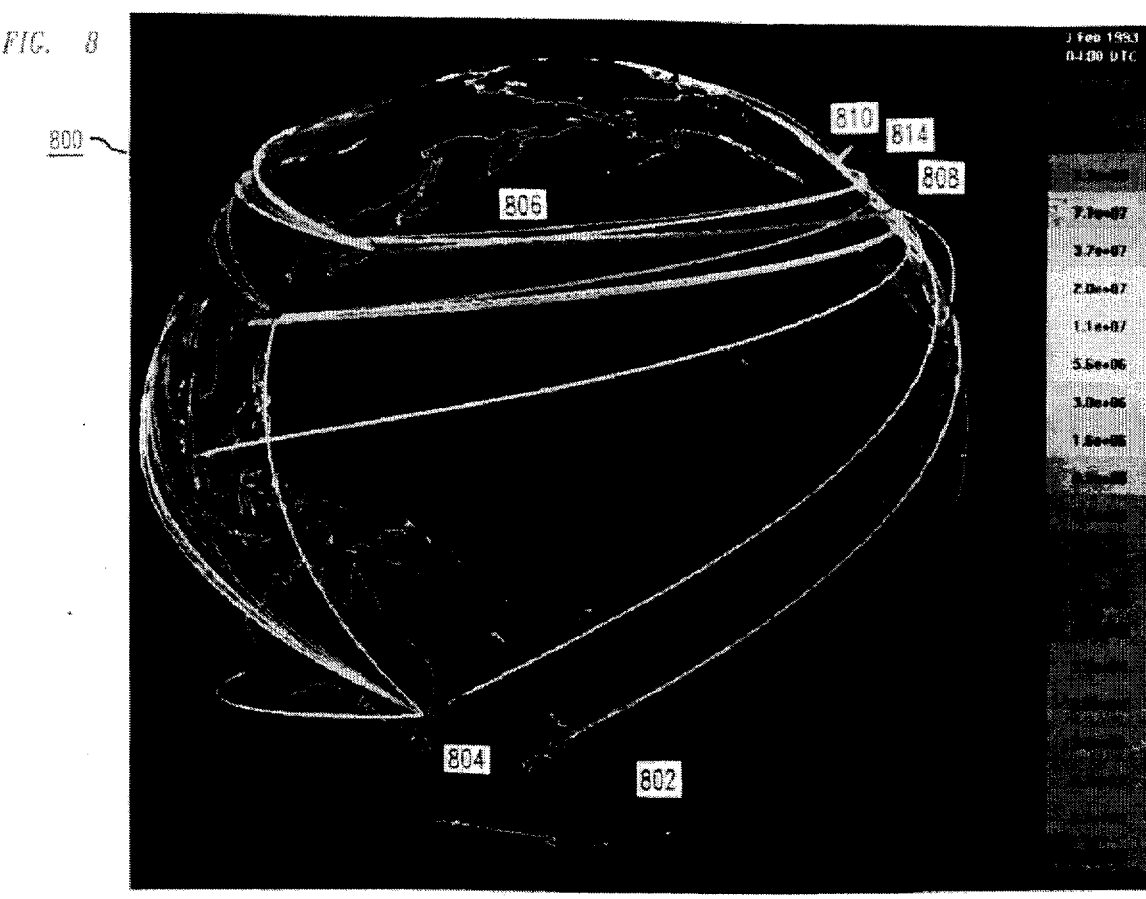
FIG. 8 shows a display image in accordance with the present invention.

FIG. 8 shows an example image 800 which would be displayed in window 310 of the display monitor 102. Two graphical components are used in drawing the globe 802, the blue sphere 804 and the continental outlines 806. The blue sphere 804 is a sphere with radius 0.995*sphereRad (where sphereRad is a constant) centered at the origin 0 of the spherical coordinate system. This sphere is created in the GlobeDrawer objects 308 OnWindowCreate function (described in further detail below) using an OpenGL Utility Library function and stored in an OpenGL display list.

The continental outlines 806 are obtained from a database which holds the outlines as a collection of line segments. The endpoints of the segments are given in latitude-longitude coordinates. Each of these latitude-longitude coordinates is used to produce a spherical coordinate (sphereRad, lon, lat) which lies on the surface of the globe sphere. This coordinate is then converted to OpenGL XYZ coordinates as described above.

The above factor of 0.995 is used to ensure that the blue sphere 804 lies slightly within the sphere defined by the continent outlines 806 and thus does not obscure the continental outlines 806.

Various modifications could readily be made to the appearance of the globe 802. The geographical information displayed consists of continental outlines 806 displayed on a blue sphere 804. The appearance of the globe 802 could be altered by filling in the continental outlines 806 with a color. This may be achieved by applying three-dimensional polygon tessellation (i.e., breaking down the polygons into a mesh of triangles that cover the globe) to the continental outline database. Further steps toward realism, such as using texture mapping to display the globe with terrain coloration, could also be done. However, this additional detail might obscure the network information.

6. Lighting

The globe 802 is illuminated by a light, which is located in the same direction as the sun for the particular frame of time-series data that is being shown. This light can be seen in FIG. 8 as originating generally from the left side of the image. This lighting effect is accomplished in the OpenGL graphics library by positioning the light in spherical coordinates with φ=0 and θ determined from the frame time. For example, θ=0 when the frame time is 12:00 UTC (Greenwich time); i.e., at noon Greenwich time the light is positioned above the equator on the Greenwich meridian. When the frame time is 6:00 UTC, θ=90 degrees, and the sun is positioned above the equator on the 90 W meridian.

It is possible to make additional use of the frame time to calculate the correct φ coordinate of the sun. φ=0 near March 21 and September 21, φ=23.5 degrees on June 21, and φ=−23.5 degrees on December 21. This would incorporate seasonal information into the display.

The illumination of the globe provides the user with a visual indication of the time of day for the data being shown. This effect is preferably used in conjunction with a color display. On a greyscale display, the smooth shading of the globe will interfere with the perception of the network, since for certain positions of the light some of the glyphs and arcs will be of approximately the same color as the sphere underlying them and will fade into the background. With the use of color, this effect can be avoided by selecting one or two hues for coloring the globe and selecting the glyph and arc colors from a range that does not include those hues.

7. Viewpoint

The viewing model of the present embodiment uses spherical coordinates. The image is drawn as if the user's eye were located in space at a ρ coordinate (distance from the center of the globe 802) of 1.2*sphereRad, looking toward the center of the globe 802. The user may vary the φ and θ coordinates of the viewpoint by dragging the mouse 106 while pressing the left mouse button 107. Dragging the mouse 106 to the right or left increases or decreases θ, while dragging the mouse 106 up and down increases or decreases φ. The effect produced by this mousing action is that mouse motions rotate the globe 802, allowing it to be viewed from any angle. A modification of this polar-viewing model which would allow users to zoom in on portions of the globe could be readily implemented.

8. Drawing Nodes

As shown in FIG. 8, the node glyphs are represented on the globe 802 as pyramids, such as glyph 808. Other glyphs, such as cubes, cylinders, cones, or spheres, could also be used. The latitude and longitude of the node will usually be fixed by the network geography. A display list is used to hold the commands necessary to draw a basic pyramid. In order to draw the node glyphs, OpenGL model-transformation commands are used to modify the coordinate system so that the pyramid will be placed at the correct location, for example at the location of the country's capital. The remaining characteristics of the glyph are free to encode information. A non-exhaustive list of such characteristics would include the size (up to three parameters because of the three dimensions), radial distance from the center of the globe, color, texture, reflectivity and other lighting effects, and shape. However, certain combinations may be more effective for encoding information than others. For example, although the size could encode three data attributes, the typical viewer may not be able to interpret them, particularly when the glyphs are viewed from various angles.

In the embodiment described herein, and shown in FIG. 8, each node is represented by a pyramid whose height and color characteristics are determined by, and encode, the node statistic attribute. The value of the node statistic for the current frame being displayed is extracted from the Nodedata table 600 and used to compute the pyramid's size and color, which are set with further OpenGL library commands. The display list is then executed to produce the pyramid. This is repeated for each node. Thus, in the present embodiment, the color and height of the nodes are used to encode information about the node, in particular, the attributes of the Nodedata related to that node. Thus, in FIG. 8, node 808 is shown generally in red and at a particular height. A color scale, similar to color scale 812 used for link data, could be provided to relate the node's color to the data attribute being encoded by the color. In this example, the height of the node 808 encodes the same attribute of the data as the color. This visual representation of node data facilitates the comparison of nodes in the display. For example, node 810 is shown as generally green in color with a height smaller than that of node 808. This indicates that node 810 has less traffic than node 808 during the time frame being displayed. Thus, encoding the node data using the color and size characteristics of the pyramid allows a user to easily compare the node statistics.

In an alternate embodiment, the positions of nodes may be determined by non-geographic means, and thus position may be a characteristic by which node data is encoded. Consider, for example, a display which shows data for international calls made from the USA. This data may be reduced to a network where the nodes are foreign countries and U.S. telephone numbers (possibly aggregated, e.g. by area code). The nodes for the countries would be placed on the surface of the globe 802 in their correct geographic position. The nodes for the U.S. numbers can then be positioned in a manner which reflects their calling patterns. For example, the location of a node representing a telephone number could be determined by minimizing the weighted link distance to the countries that the user called, using a positioning technique such as that described in copending U.S. patent application Ser. No. 08/141,885, AT&T Docket No. Eick-Wills 10-2, filed Oct. 22, 1993, Graphical Display of Relationships. See also, Stephen G. Eick and Graham J. Wills, "Navigating Large Networks With Hierarchies", *Visualization '93 Conference Proceedings*, San Jose, Calif., Oct. 25–29, 1993, pages 204–210.

Figure 19:
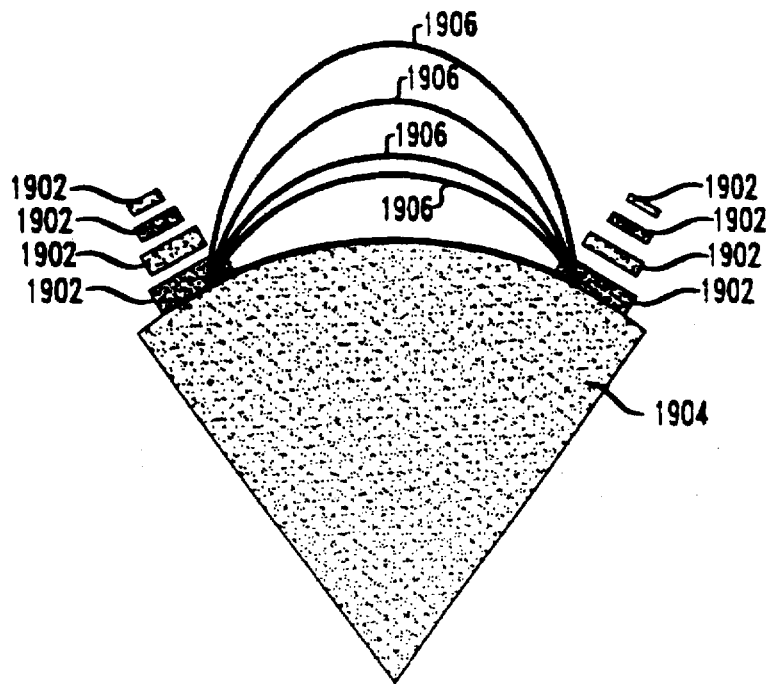
FIG. 19 illustrates the use of the third dimension to allow multiple glyphs to be associated with each node and link.
Figure 20:
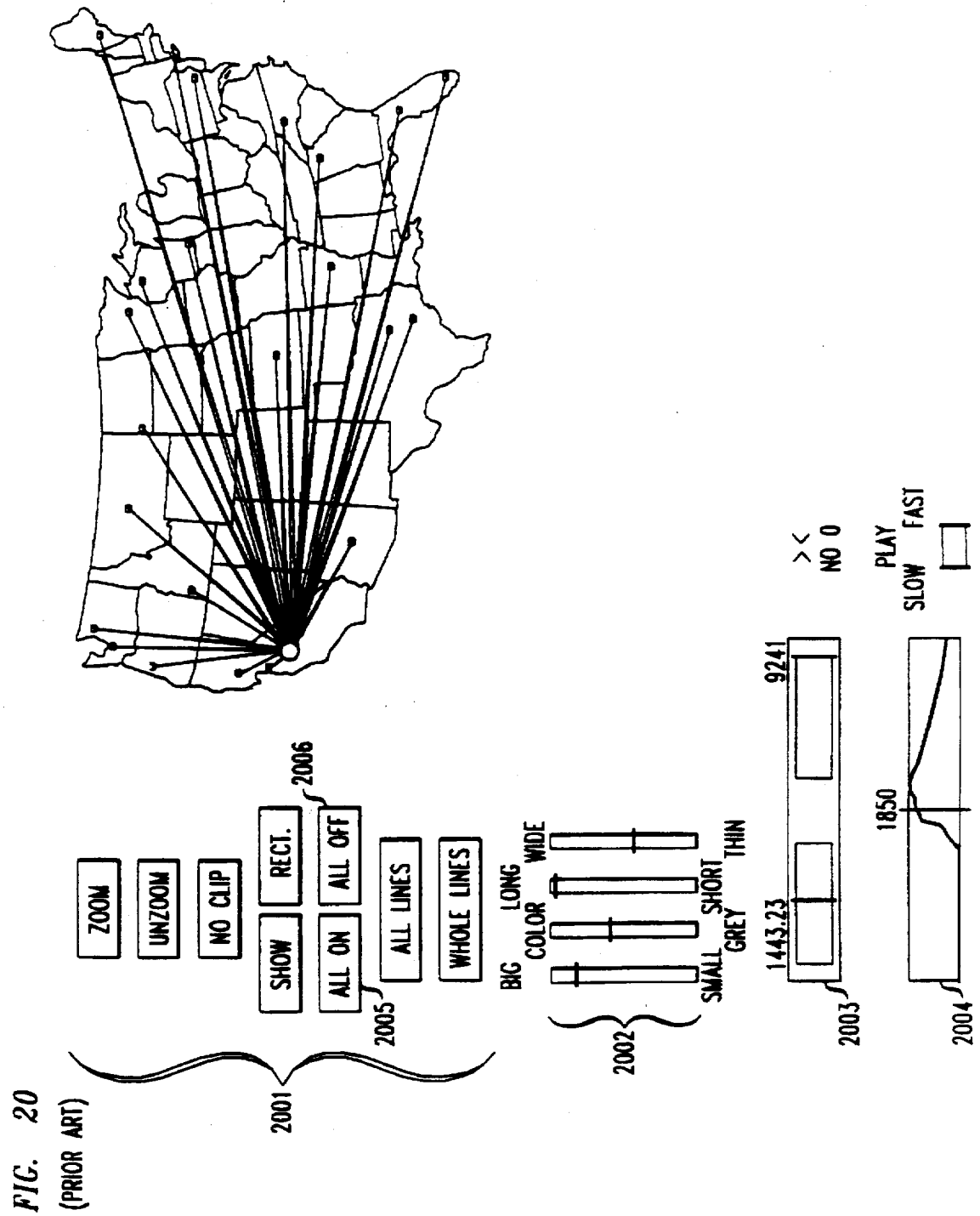
FIG. 20 shows a prior art display of network information.
Figure 21:
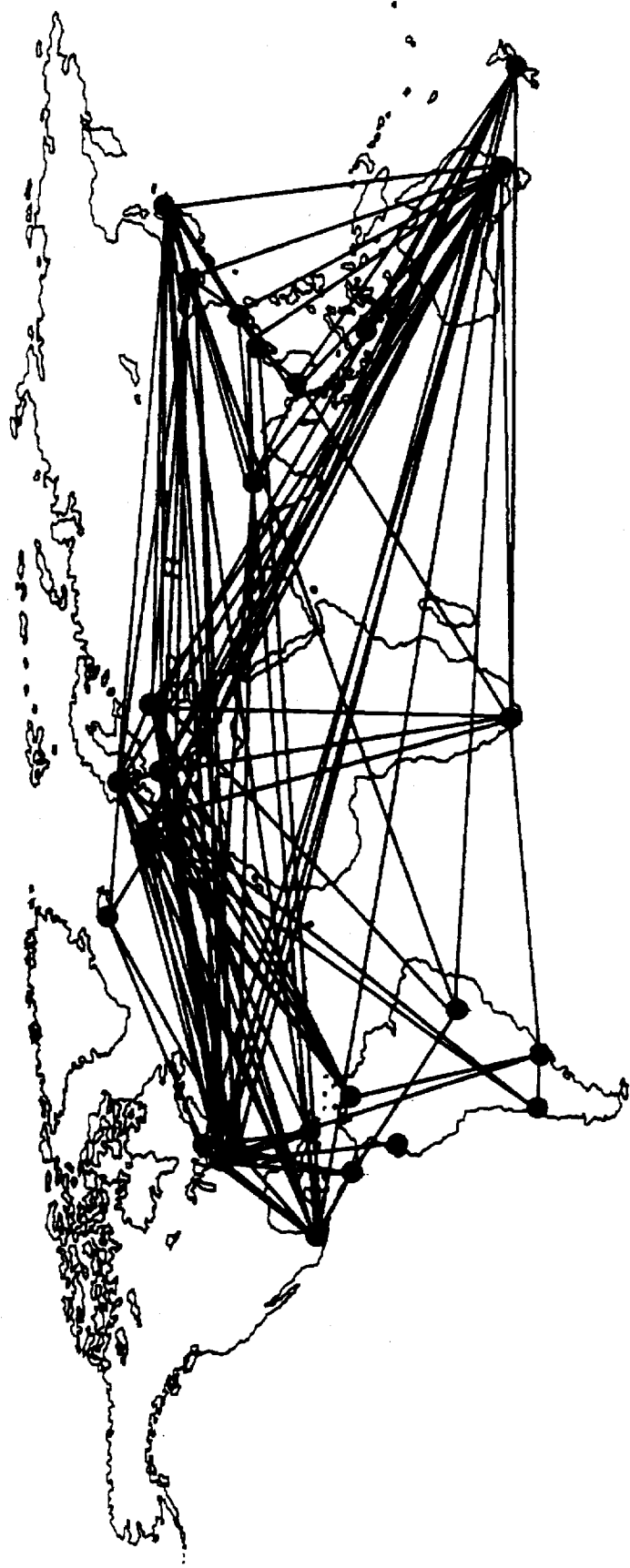
FIG. 21 shows a prior art display of network information.

The use of the third dimension also allows multiple glyphs to be associated with each node and link. As shown in FIG. 19, several node glyphs 1902 can be "stacked" at one geographic location (latitude and longitude) by placing them at different radial distances from the surface 1904 of the globe. Each of these node glyphs 1902 may encode different node statistics. Similarly, several arcs 1906 can connect two nodes, with the third dimension serving to separate them.

9. Drawing Arcs

As shown in FIG. 8, in one embodiment the link statistics are represented by arcs, such as arc 814, which connect the capitals of the countries. The arcs touch the globe 802 at each end and reach maximal height in the center. This height is used to encode the link statistic, with greater heights representing larger values. The width of the line used to draw the arc and the color of the arc are also used to encode this statistic. The color scale 812 indicates the color encoding of the links. The links are drawn as follows.

Figure 9:
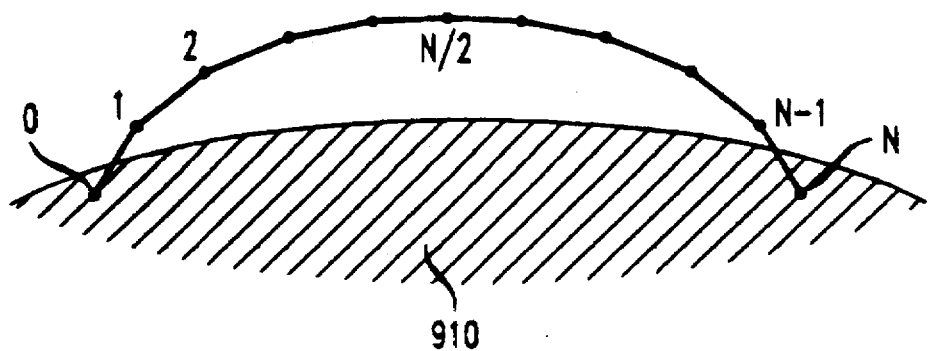
FIG. 9 illustrates the drawing of arcs.

Spherical coordinates are used in the creation of the arcs that encode the link statistics. With reference to FIG. 9, each arc is made up of a series of line segments connecting some number N of points. The number of points will be determined by the total length of the arc, so as to create a smooth-appearing curve. Two independent calculations are performed. The first calculation determines the $\theta$ and $\phi$ coordinates of the points, and the second determines the $\rho$ coordinate. These results are combined and converted into XYZ coordinates for use with the OpenGL graphics library.

9.1 $\theta$ and $\phi$ Calculation

The $\theta$ and $\phi$ calculation defines the arc's path over the surface of the globe. In FIG. 9, the surface of the globe is represented as the shaded area 910. Various types of these paths are shown on two-dimensional maps in FIGS. 10A, 10B, and 10C. Each of these three maps illustrates one path-calculation method by showing paths from Britain to the United States, Australia, India, and South Africa. The maps use a rectangular coordinate system, that is, one in which the X- coordinate of the point is the longitude and the Y-coordinate is the latitude.

Figure 10A:
FIG. 10A illustrates arc paths based on the rectangular coordinate system of projection.

FIG. 10A shows paths based on the rectangular coordinate system used to draw the maps. The paths are, of course, straight lines on the two-dimensional map. The coordinates of points on these paths are particularly easy to generate given the coordinates of the endpoints. This rectangular coordinate system of projection produces the type of display shown in FIG. 8.

Figure 10B:
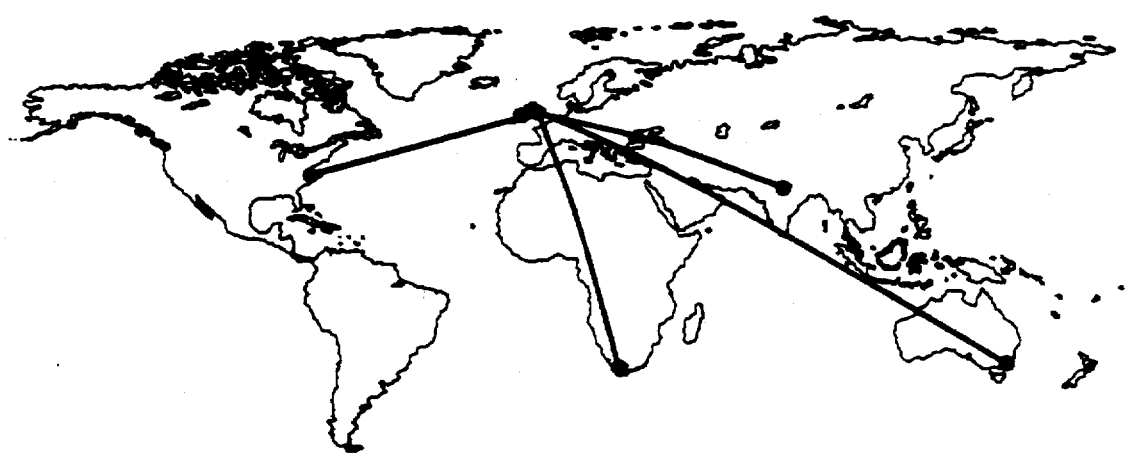
FIG. 10B illustrates arc paths based on the Mercator coordinate system of projection.

The map in FIG. 10B shows paths based on the Mercator coordinate system, which is commonly used for wall maps. The X-coordinate of a point is proportional to the longitude, while the Y-coordinate is proportional to $\log(\tan(45°+\psi/2))$ These paths would be straight lines on the Mercator projection. They are very nearly straight lines on the projection shown in FIG. 10B.

Figure 10C:
FIG. 10C illustrates arc paths based on the polar system (also referred to as the great circle system) of projection.

The map in FIG. 10C shows paths based on a polar projection centered on one of the path's endpoints. The lines correspond to great circles on the globe. Thus, each arc takes the shortest route to the other endpoint. This great circle system of projection produces the type of display shown in FIG. 11.

9.2 $\rho$ Calculation

The $\rho$ calculation determines the distance of each point on the arc from the center of the globe, and thus indirectly determines the height of each point above the surface of the globe. As with the $\theta$ and $\phi$ calculation, $\rho$ can be computed in various ways. One method of calculating $\rho$ that encodes a link attribute is as follows.

As discussed above, the link attributes in one embodiment are stored in the Linkdata table 500. When the system draws the link between nodes i and j during time frame f, the link attribute at Linkdata[f][i][j] is read. This attribute is then normalized to lie between 0.0 and 1.0. This is accomplished by a linear scaling such that the minimum link attribute (i.e. the minimum value appearing anywhere in Linkdata) is scaled to 0.0 and the maximum link attribute to 1.0. This link attribute is converted into the desired maximum height H by multiplying it by an appropriate constant.

Referring again to FIG. 9, each arc has N+1 points, numbered 0 through N. Points 0 and N have $\rho$=sphereRad; point N/2 has $\rho$=sphereRad+H; and the $\rho$ coordinate for the other points smoothly vary between these two values. This can be done by calculating $\rho[i]$ ($\rho$ of the i'th point) by a formula such as:

$$\rho[i]=\text{sphereRad}+H*f(i)$$

where f is a function that is 0 at 0 and N, 1 at N/2, and varies as desired. Many functions can be used for f. In the current embodiment the function f is $\sin(pi*i/N)$. This is the function used to create the arcs shown in FIGS. 8 and 11. An equivalent method of calculating the $\rho$ coordinates is to define a radial height parameter ht, which is a height relative to the sphere's radius, rather than the parameter H which is an absolute height above the surface of the sphere. The use of this radial height parameter ht changes the above equation to:

$$\rho[i]=\text{sphereRad}*(1.0+\text{ht}*\sin(pi*i/N))$$

The use of the relative height ht simplifies some aspects of the design. For example, bounding the relative height ensures that the arcs never go outside the volume of space that is visible in the image.

Figure 12:
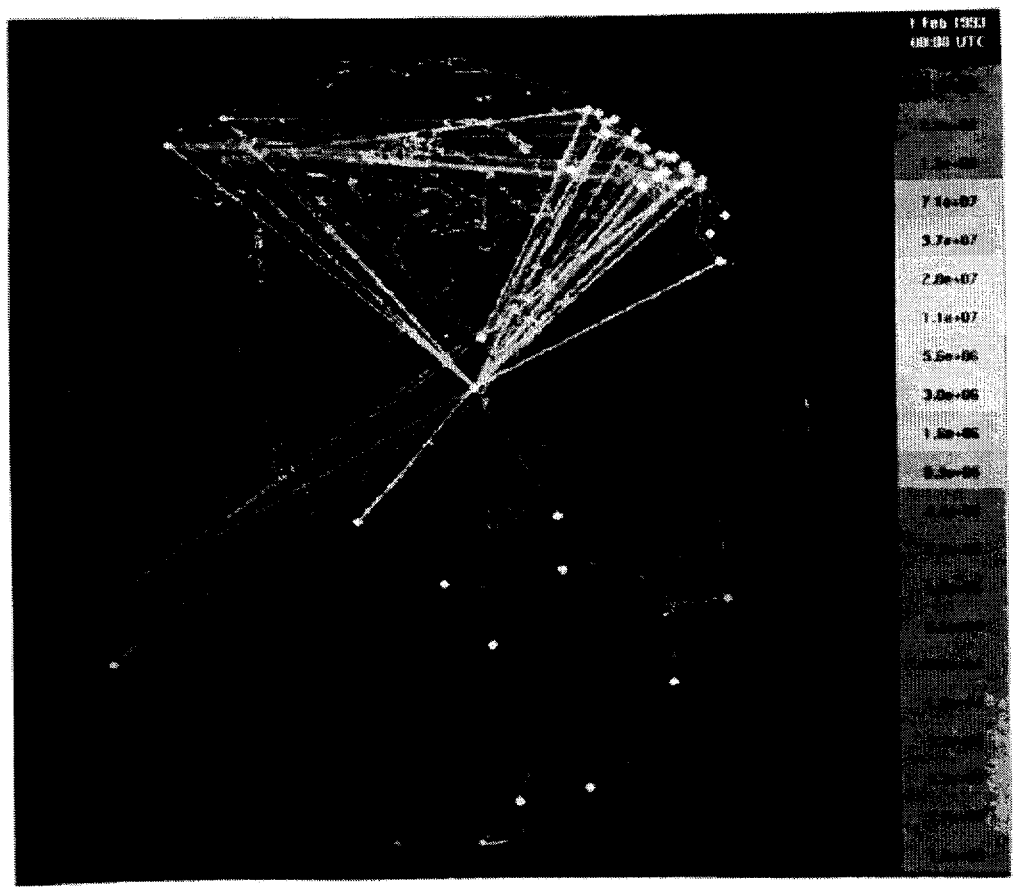
FIG. 12 shows a display image with arcs taking paths below the surface of a translucent globe.

It is possible to display arcs below the surface of the globe by allowing the above calculations to produce ρ values less than the sphere's radius. In such a case, the arcs will lie partly or wholly inside the globe. This can be effectively used to encode negative attribute values. In either equation for ρ[i] above, a value of H or of ht less than 0 results in an arc that lies below the surface of the globe. If arcs are to be displayed below the surface, then the globe must be translucent so that the arcs will still be visible. FIG. 12 shows such a display with the links as straight lines taking a path below the surface of the globe with a translucent globe. In addition, the arcs which are located further from the viewer are dimmed using fog effects. This is a depth-cueing effect that makes more distant objects appear dimmer and thus makes the three-dimensional structure more apparent.

It is also possible to modify the lengths of the arcs by using a line shortening slider as described in U.S. Pat. No. 5,136,690, entitled Dynamic Graphical analysis of Network Data.

Arc characteristics other than color, height, and width can be used to encode link data. For example, the particular path chosen could be used to encode data. A rectangular, Mercator, or great-circle path may be chosen depending on the link data. Continuous variables could be encoded by deflections to the side of the basic path. An additional technique would be to use a different function f depending on some link attribute. Further, the endpoints of the arcs can be displayed at a height above the surface of the globe. Other arc characteristics which can encode data are shape, texture, reflectivity, and other lighting techniques. However, as discussed above in connection with node characteristics, users may not be able to effectively perceive data that is encoded using some of these techniques, particularly with many paths and possible orientations.

10. Thresholding Techniques

Thresholding refers to techniques for simplifying the display by removing some glyphs, usually under the user's control. The three-dimensional display allows for novel types of thresholding. One thresholding effect is obtained by the use of a clipping surface. This is a graphical object which is moved through the three-dimensional image and obscures portions of the graphics. The clipping surface may be opaque or translucent. The user may be able to control the surface's translucency.

Figure 13A:
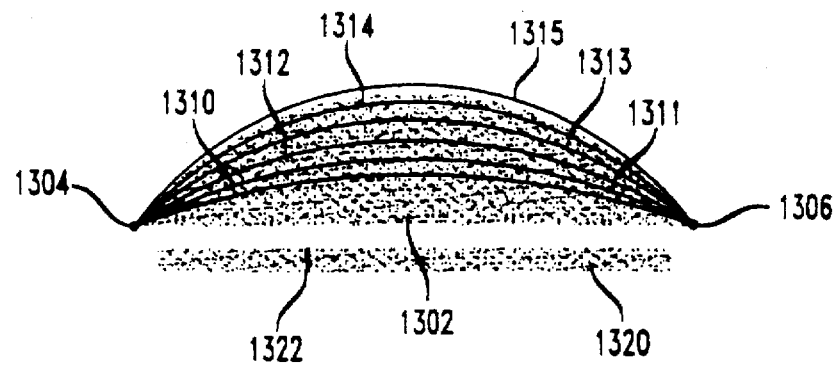
FIGS. 13A–13D illustrate the use of the globe as a clipping surface to perform thresholding operations.
Figure 13B:
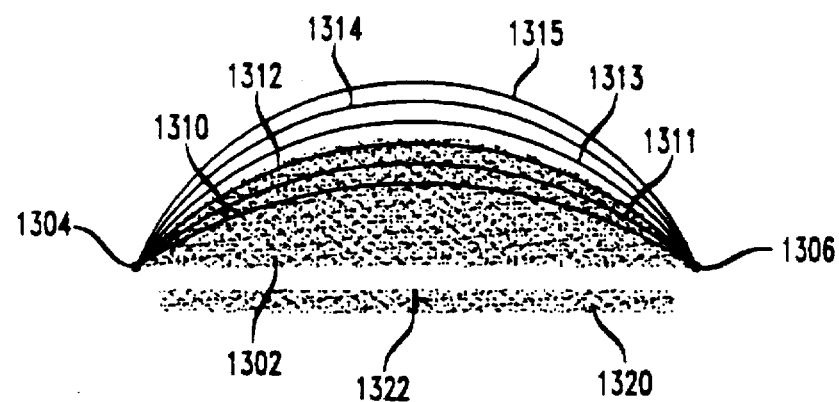
Figure 13C:
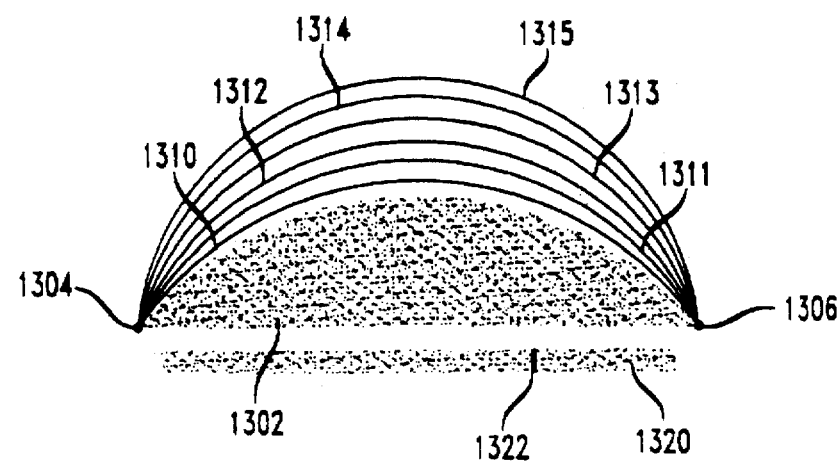

If the sphere used to draw the globe is opaque, it will obscure any arcs or other glyphs that lie within it. When coupled with interactive controls that allow the user to modify the manner in which the arc paths are generated, this allows the globe sphere to be used as a clipping surface. This use of the globe as a clipping surface is illustrated in FIGS. 13A–13D. The shaded area 1302 in FIGS. 13A–13C represents a slice through the globe. Two nodes, node 1304 and node 1306 are shown. In FIGS. 13A–13C, the arcs 1310 through 1315 are shown connecting node 1304 to node 1306, with the height above the surface encoding some attribute value. Assume that the attribute values are normalized to contain values between 0 and 1; the highest arc 1315 corresponds to an encoded attribute value of 1.0; the lowest arc 1310 corresponds to an encoded attribute value of 0.0; and the other arcs 1311, 1312, 1313 and 1314 are distributed between these values.

Figure 13D:
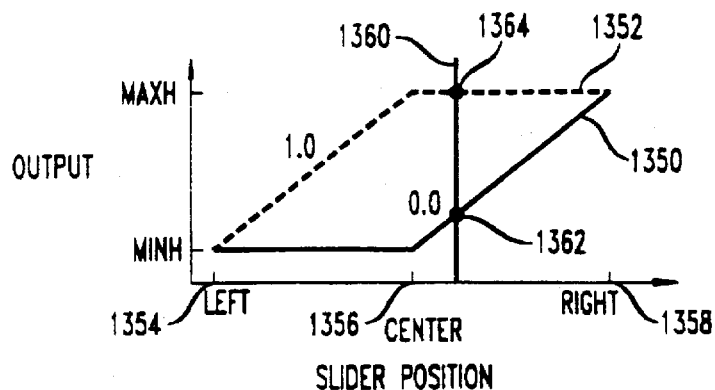

FIGS. 13A–13C also show a user configurable interactive slider 1320, with a slider indicator 1322, through which the user can manipulate the generation of the arcs. The slider 1320 controls the way in which the attribute values are transformed into the maximum height of the arcs. The slider determines the range of output heights to which the input attribute values (lying between 0 and 1) are transformed. The output heights fall between two values: MINH and MAXH. This is shown in FIG. 13D. The horizontal axis of the graph represents the slider position, while the vertical axis is the output height value. The solid line 1350 shows the output height value that an input attribute value of 0.0 produces, while the broken line 1352 shows the output height value that an input attribute value of 1.0 produces.

At the leftmost position 1354 of the slider, the minimum and maximum output heights are both MINH. As the slider is moved to the right, the minimum output height remains at MINH and the maximum output height increases steadily, until at the center slider position 1356 the minimum output height is MINH and the maximum output height is MAXH. Further rightward movement of the slider causes the minimum output height to increase while the maximum output height remains at MAXH. At the rightmost position 1358 of the slider the minimum and maximum output heights are both MAXH.

As an example of this calculation, assume the slider position is set as indicated by line 1360. The slider setting is slightly to the right of the center position 1356. An input value of 0.0 will produce an output height somewhat above MINH, as indicated by the intersection of the line 1350 and line 1360 at point 1362. An output value of 1.0 will produce an output height of MAXH, as indicated by the intersection lines 1352 and line 1360 at point 1364. Intermediate input values map linearly to the range of output values.

Thus, as an example, in FIG. 13A the slider indicator 1322 is located about one-fourth of the way along its range. Only one of the six arcs, arc 1315, lies above the shaded area 1302, illustrating that only arc 1315 would be visible above the surface of the globe. In FIG. 13B, the slider indicator 1322 is located near the midpoint of its range, and three of the six arcs, 1315, 1314, and 1313 lie above the shaded area 1302 and thus would be visible above the surface of the globe. In FIG. 13C, the slider indicator 1322 is further to the right and all the arcs, 1310 through 1315 lie above the shaded area 1302 and thus would be visible above the surface of the globe. To the user, the effect of manipulating the slider 1320 is that the arcs move up and down, becoming visible or obscured.

Another type of clipping surface is a clipping plane which the user could orient arbitrarily (e.g., along particular lines of latitude or longitude). The plane would obscure anything behind it. It is desirable to construct such a clipping surface so that it does not obscure the globe.

Other thresholding techniques may also be incorporated into the three dimensional display. For example, both links and nodes can be selected on the basis of the link attribute by using the thresholding techniques described in Becker et al., U.S. Pat. No. 5,136,690, Dynamic Graphical Analysis of Network Data; and Richard A. Becker and Stephen G. Eick, "Visualizing Network Data", *IEEE Transactions on Visualization and Graphics*, Vol. 1, No. 1, 1995, pages 16–28.

11. Program Flow

Figure 14:
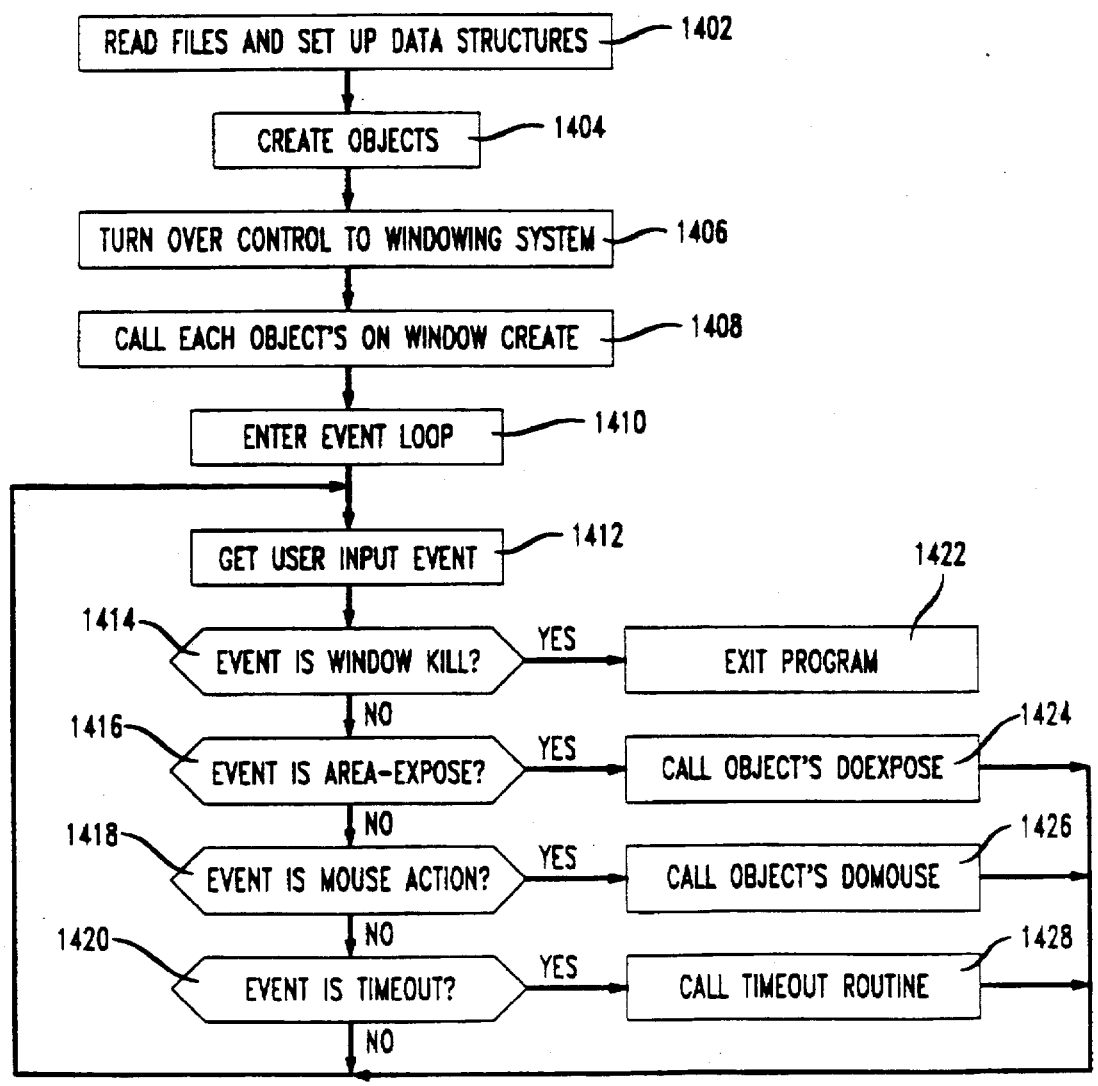
FIG. 14 is a flow diagram of the overall flow of control for the application program code and libraries.

FIG. 14 shows the overall flow of control for the application program code and libraries. In step 1402 data files are read and the network tables Nodes 400, Linkdata 500, and Nodedata 600 are initialized. In step 1404 the GlobeViewer object 302, GlobeDrawer object 308, and Scale object 306 are created. The application code then calls the windowing system's event loop function in step 1406, turning over control to the windowing system 210. This function never returns. The only way control returns to the application code 202 is via the callback functions associated with the objects.

The first of these callbacks to be performed occurs when the windowing system main loop function does its own initialization, which causes the windowing system objects to be initialized and the window 310 to appear on the display monitor 102. This in turn causes the OnWindowCreate callback function of each application code object to be called as represented by step 1408. The only object with an OnWindowCreate function is the GlobeDrawer object 308. Its actions are described below.

When window 310 appears, the windowing system 210 enters its event loop in step 1410. In this loop it receives and processes user input in the form of events. Four events are of interest in the present embodiment. In step 1412 the user input event is received. In step 1414 it is determined if the event is a window-kill event, which is triggered when the user closes the window 310. If the event is a window-kill, then the program exits in step 1422. In step 1416 it is determined if the event is an area expose event. An area-expose event is one which requires that the image be redrawn. If the event is an area-expose event, then an application object's DoExpose callback function is called in step 1424. In step 1418 it is determined if the event is a mouse action. If the event is a mouse action, then an application object's DoMouse callback function is called in step 1426. In step 1420 it is determined if the event is a time-out. If the event is a time-out, then a time-out function is called in step 1428.

Figure 15:
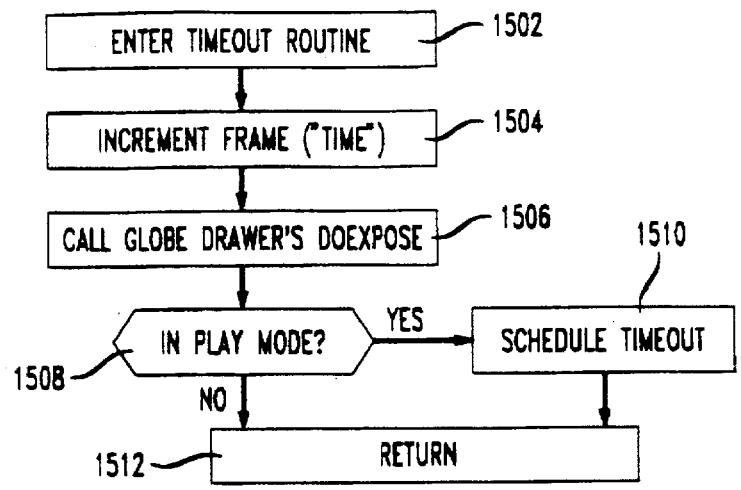
FIG. 15 is a flow diagram of the time-out function.

The time-out function is shown in FIG. 15 and is used in conjunction with the animation aspect of the present embodiment. The display may be animated to sequentially display data relating to different time frames. The time-out function is entered in step 1502. When it is called, the current frame number (i.e., which slice of the time-series data is to be displayed) is incremented in step 1504. This changes the displayed image, so the GlobeDrawer's DoExpose function is called in step 1506 to cause the redraw. In step 1508 it is determined if the program is in play mode. This is determined by checking a flag which indicates whether animation is being done. If the program is in play mode, then a new time-out is scheduled in step 1510. Control is returned in step 1512.

Figure 16:
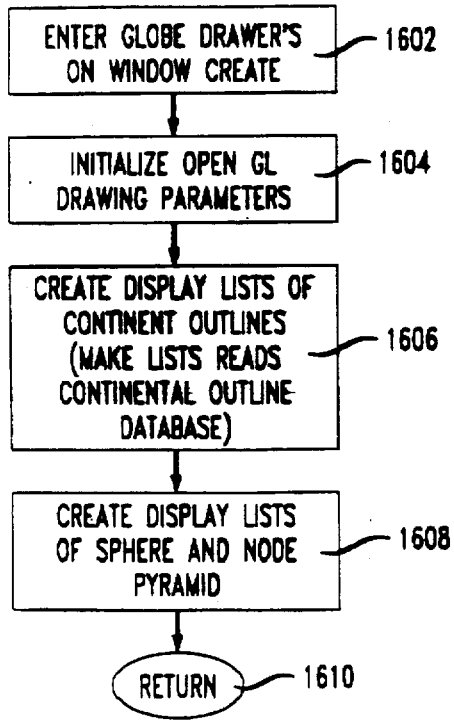
FIG. 16 is a flow diagram of the OnWindowCreate callback function.

FIG. 16 shows the OnWindowCreate callback function. The function is entered in step 1602. This function first initializes a number of OpenGL parameters in step 1604. In the embodiment shown in FIG. 8, these are the clearing color, the z-buffer configuration, and the lighting configuration. (The z-buffer, also called the depth buffer, is an OpenGL method of performing hidden surface removal.) In step 1606, one or more display lists are created that cause the map to be drawn on the globe sphere. In the present embodiment, where the map is rendered as a series of lines showing the continents, these lists are created by the MakeLists function, which accesses a geographic database containing the coordinates of the lines. A display list containing a sphere (i.e., commands that cause a sphere to be drawn) and another list containing a pyramid are created in step 1608. The function returns in step 1610.

Figure 17:
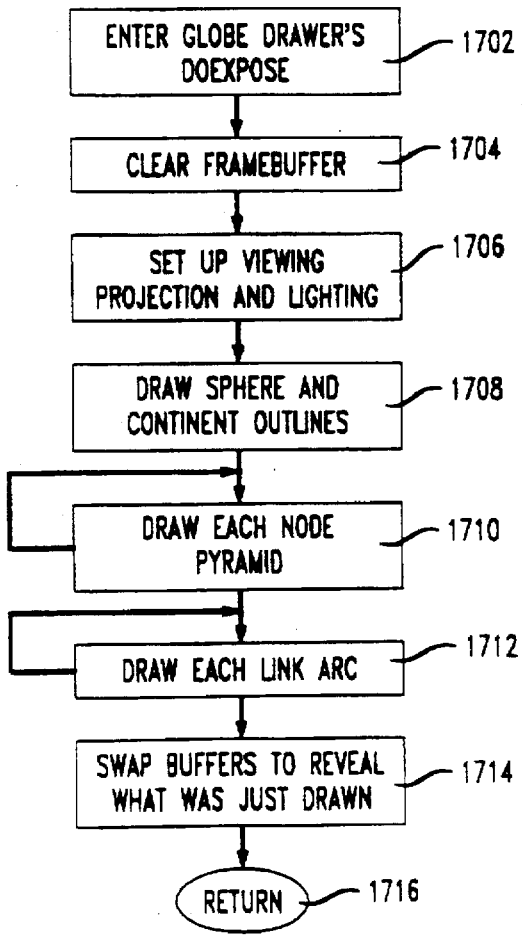
FIG. 17 is a flow diagram of the DoExpose callback function.

FIG. 17 shows the DoExpose callback function. The function is entered in step 1702. This function first clears the framebuffer (the image) by setting it to black in step 1704. In step 1706 the viewing projection and lighting is set up by using OpenGL commands to initialize several matrices that transform points in three-dimensional space to the Globe-Drawer object's 308 area of the screen 314. The sphere and continental outlines are then drawn by calling the display lists in step 1708. In step 1710 the nodes are drawn by placing an appropriately scaled and colored pyramid at each node location. The arcs are then drawn in step 1712. Steps 1704 through 1712 are carried out in double-buffered mode. In double-buffered mode there are actually two images in the system. The user is seeing one of the images while the other is being created. In step 1714 the buffers are swapped to reveal the new image. The function returns in step 1716.

Figure 18:
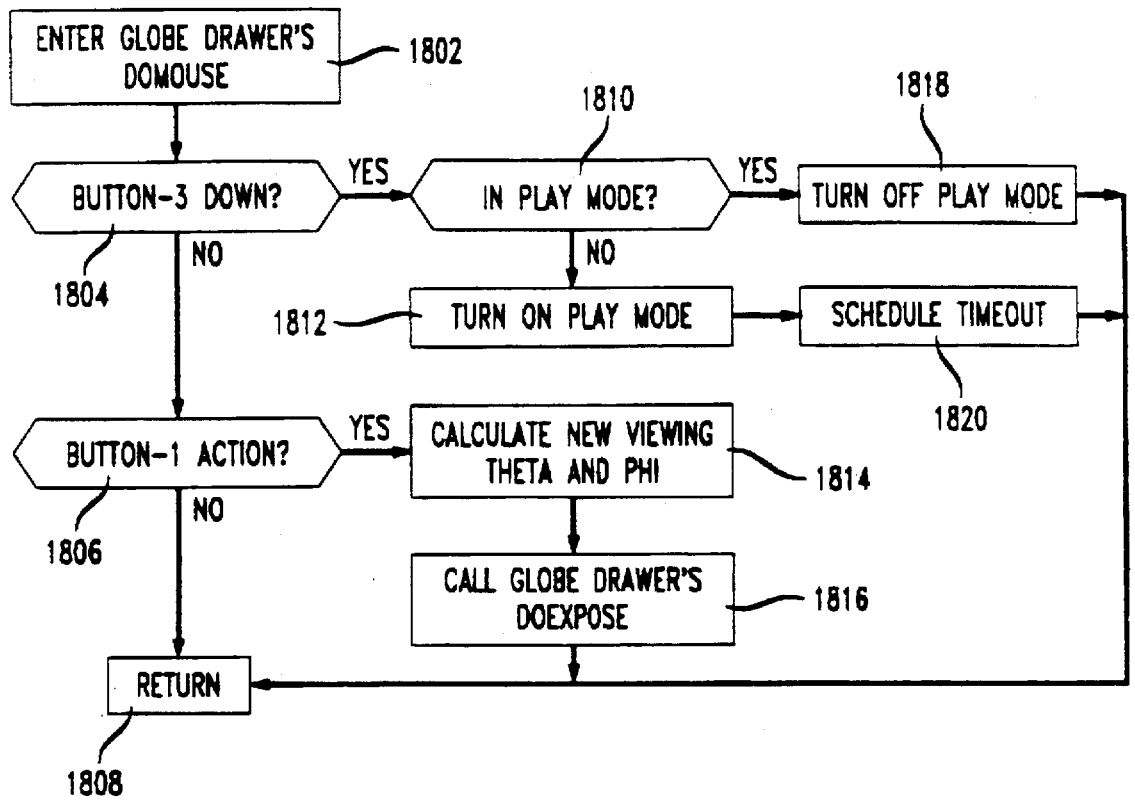
FIG. 18 is a flow diagram of DoMouse callback function.

FIG. 18 shows the DoMouse callback function. The function is entered in step 1802. In step 1804 it is determined whether the user has clicked the right mouse button 109. The right mouse button 109 turns play mode on or off. If the right mouse button 109 was clicked, then it is determined in step 1810 whether the system is currently in play mode. If not, then play mode is turned on in step 1812, a time-out is scheduled in step 1820, and the function returns in step 1808. If the system was in play mode, then play mode is turned off in step 1818 and the function returns in step 1808. If it was determined in step 1804 that the right mouse button 109 was not clicked, then it is determined in step 1806 whether the user has clicked the left mouse button 107. Actions with the left mouse button 107 held down are used to calculate a new viewpoint. If the left mouse button 107 is down, then a new viewpoint θ and φ are calculated in step 1814 and the display is updated by calling the GlobeDrawer DoExpose function in step 1816. The function returns in step 1808.

12. Conclusion

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the invention has been described as using a globe as the basis for displaying network data. However, other three-dimensional structures can be used to display networks. For example, a Mercator or other planar projection can be used to display the Earth in a plane, and the network glyphs can be arranged in the space above this plane; or such a projection can be displayed on the surface of a cylinder, and the glyphs arranged in the space outside the cylinder. In addition, other techniques can be incorporated into the three dimensional display which result in novel information display techniques. For example, controls to modify the link and node colors; to select links and nodes on the basis of the link attribute; to change the way in which links and nodes are drawn, such as using a line-shortening slider; to choose a particular data frame to examine; and to select or deselect nodes and links, thereby causing them to be displayed or not displayed respectively. Such modifications could be readily implemented by one skilled in the art.

We claim:

1. An apparatus for representing information in a display in a computer system, said information describing entities and relationships between pairs of entities, said apparatus comprising:

means for displaying a surface representation on said display;

means responsive to said information for displaying a plurality of entity representations on said display, each of said entity representations corresponding to one of said entities; and means responsive to said information for displaying a plurality of arcs at positions appearing at least in part disposed from said surface representation on said display, each of said arcs connecting the entity representations of a pair of entities, wherein the position of each of said arcs relative to said surface representation is a function of an attribute of the relationship between a pair of entities.

2. The apparatus of claim 1 further comprising:

means for displaying a map on said surface representation.

3. The apparatus of claim 2 wherein said information further comprises time series data, said apparatus further comprising:

means responsive to said information for varying the illumination of said surface representation to represent the time interval of the information being represented on said display.

4. The apparatus of claim 1 wherein said means responsive to said information for displaying a plurality of arcs on said display further comprises means for displaying a plurality of arcs at positions appearing at least in part below said surface representation on said display.

5. The apparatus of claim 1 wherein said means responsive to said information for displaying a plurality of arcs on said display further comprises means for displaying a plurality of arcs at positions appearing at least in part above said surface representation on said display.

6. The apparatus of claim 1 wherein said means responsive to said information for displaying a plurality of entity representations on said display further comprises means for displaying a plurality of entity representations appearing above said surface representation on said display.

7. The apparatus of claim 1 further comprising:

means responsive to user interaction for modifying the position of said arcs relative to said surface representation.

8. The apparatus of claim 7 wherein said means responsive to user interaction further comprises:

means for modifying the positions of said arcs, such that the arcs connecting the entity representations of pairs of entities for which said attribute is below a threshold value do not appear on said display.

9. The apparatus of claim 1 wherein said means responsive to said information for displaying a plurality of entity representations further comprises:

means for displaying said entity representations with a height relative to said surface representation, wherein said height represents an attribute of said entity.

10. the apparatus of claim 9 further comprising:

means responsive to user interaction for modifying the height of said entity representations relative to said surface representation.

11. The apparatus of claim 9 wherein said means for displaying said entity representations with a height relative to said surface representation further comprises means for displaying an entity representation as appearing below said surface representation when the attribute of said entity is below a threshold value.

12. An apparatus for representing information in a display in a computer system, said information describing relationships between pairs of entities, said apparatus comprising:

means for displaying a representation of the surface of a first sphere on said display, said first sphere having a first center;

means responsive to said information for displaying pairs of entity representations corresponding to pairs of related entities on said display; and means responsive to said information for displaying a plurality of arcs connecting the pairs of entity representations, wherein the maximum radial distances of said arcs from said first center are a function of an attribute of the relationship between pairs of entities.

13. The apparatus of claim 12 further comprising:

means responsive to user input for defining a clipping surface to obscure certain ones of said arcs from said display.

14. The apparatus of claim 13 wherein said clipping surface appears as a clipping sphere concentric with said first sphere, said clipping sphere having a radial distance from said first center, wherein said means responsive to user input for defining a clipping surface further comprises:

means for varying the radial distance of said clipping sphere from said first center; and means for obscuring the portions of arcs which have a radial distance from said first center which is less than the radial distance of said clipping sphere from said first center.

15. The apparatus of claim 12 wherein the surface of said first sphere appears translucent.

16. The apparatus of claim 15 further comprising:

means responsive to user input for varying the translucence of said first sphere.

17. The apparatus of claim 16 wherein said surface representation appears at least in part transparent.

18. An apparatus for displaying information describing entities, in a three dimensional representation on a computer display, said apparatus comprising:

means responsive to said information for displaying graphical glyphs on the display screen such that the position of each of said glyphs in a first dimension and a second dimension is a function of an attribute of a particular one of said entities; and means responsive to said information for displaying a plurality of arcs at positions appearing at least in part disposed from a surface of said representation on said display, such that the position of each of said arcs in a third dimension relative to said surface is a function of at least one attribute of said particular one of said entities.

19. The apparatus of claim 18 further comprising:

means for altering a characteristic of said nodes in a third dimension such that said characteristic is a function of an attribute of said node information.

20. The apparatus of claim 19 wherein said characteristic of said node in a third dimension is height.

21. The apparatus of claim 18 further comprising means for displaying a sphere having a surface with each position on said surface being described by a latitude and a longitude, wherein said first dimension is defined by said latitude, said second dimension is defined by said longitude, and said third dimension is defined relative to said surface.

22. The apparatus of claim 21 further comprising means for projecting a map on the surface of said sphere.

23. A method for displaying network information in a three dimensional representation on a display in a computer system, said network information representing relationships between pairs of nodes in said network, said method comprising the steps of:

displaying a surface representation on said display;

displaying a plurality of nodes on said display; and displaying a plurality of arcs at positions appearing at least in part disposed from said surface representation on said display, said arcs connecting pairs of nodes, wherein the position of each of said arcs relative to said surface representation is a function of an attribute of the relationship between a pair of nodes.

24. The method of claim 23 further comprising the step of displaying a map on said surface.

25. The method of claim 24 wherein said step of displaying a plurality of arcs further comprises the step of:

displaying a plurality of arcs as Mercator projections.

26. The method of claim 24 wherein said step of displaying a plurality of arcs further comprises the step of:

displaying a plurality of arcs as great circle projections.

27. The method of claim 24 wherein said step of displaying a plurality of arcs further comprises the step of:

displaying a plurality of arcs as rectangular coordinate projections.

28. A method for representing information describing a plurality of nodes on a three dimensional display in a computer system, said information comprising node attributes, the method comprising the steps of:

displaying a representation of a curved surface on said display, said surface defining a first and second dimension; and displaying a plurality of three dimensional nodes on said display wherein the characteristics of said nodes displayed in the third dimension are a function of said node attributes.

29. The method of claim 28 wherein said information further describes the links between said nodes, said information comprising link attributes, said method further comprising the step of:

displaying arcs connecting said nodes, wherein the characteristics of said arcs displayed in the third dimension are a function of said link attributes.

30. The method of claim 29 further comprising the step of:

altering the characteristics of said arcs in said first and second dimensions as a function of said link attributes.

31. The method of claim 28 further comprising the step of:

altering the characteristics of said nodes in said first and second dimensions as a function of said node attributes.

* * * * *